May 7, 1968

H. L. MORGANROTH 3,382,131

MOTION PICTURE FILM SPLICER

Filed Oct. 21, 1965

INVENTOR.
HARRY L. MORGANROTH
BY *Morgan A. Baskin*

ATTORNEY.

May 7, 1968     H. L. MORGANROTH     3,382,131
MOTION PICTURE FILM SPLICER
Filed Oct. 21, 1965     3 Sheets-Sheet 2
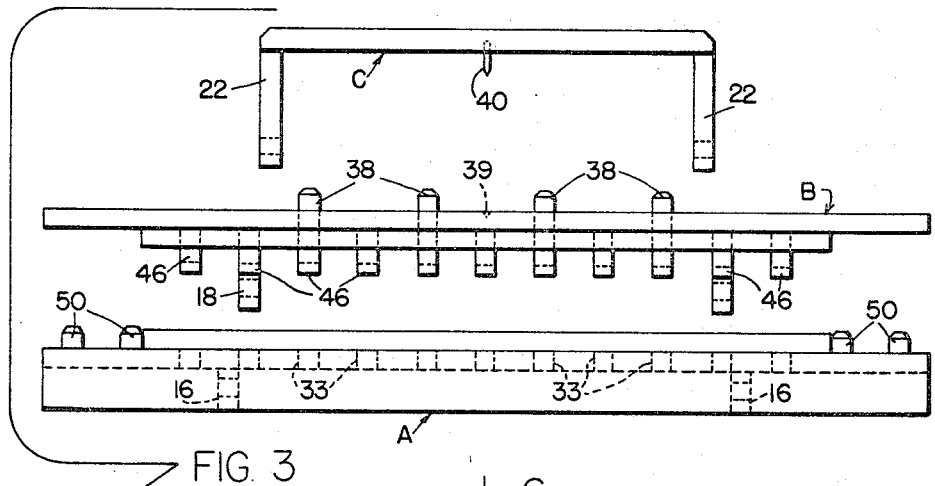
FIG. 3
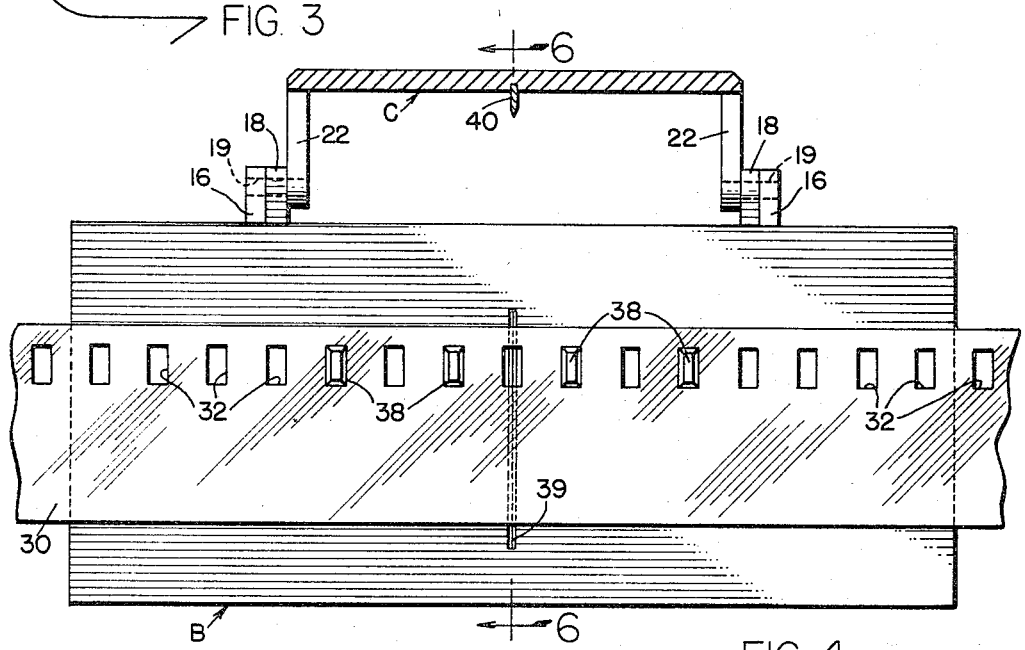
FIG. 4
FIG. 9
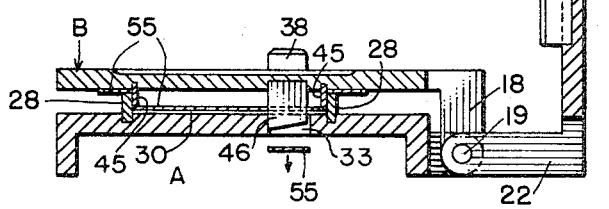
*INVENTOR.*
HARRY L. MORGANROTH
BY *Meyer A. Baskin*
ATTORNEY.

*INVENTOR.*
HARRY L. MORGANROTH
BY Meyer A. Baskin
ATTORNEY.

ary and professional and a new content of the structure of old prior art devices
United States Patent Office 3,382,131
Patented May 7, 1968

3,382,131
MOTION PICTURE FILM SPLICER
Harry L. Morganroth, 804 E. 28th St.,
Hialeah, Fla. 33013
Filed Oct. 21, 1965, Ser. No. 500,392
11 Claims. (Cl. 156—505)

This invention relates to improvements in film splicing devices and, more particularly, to splicing devices for motion picture film or the like.

This invention is directed to the provision of an improved "dry-splice" of film strip ends by joining the abutting separated ends through the use of transparent adhesive material, such as plastic tape for example. "Scotch" tape may be employed, or thin transparent material such as "Mylar" which has excellent strength characteristics. It is contemplated in the film splicing device of this invention to use a "low tack" pressure sensitive adhesive which presents many advantages in handling, although "high tack" adhesives may be used, or combinations thereof, if desired.

The most commonly employed old prior art method is well known. It generally required the scraping of the film emulsion from the end portion of one film section, or both ends which were to be spliced together. Next, a bonding solution or the proper acetone cement was applied to the scraped ends, which ends were then overlapped and pressed together until the bonding cement had dried and set.

Obviously this well known operation required considerable time and skill and frequently resulted in a poor joining of the ends due to many causes. These included incomplete scraping of the gelatin surface, the inadvertent use of the wrong type of cement for a particular film material, insufficient pressure, or insufficient drying time, all of which errors would cause a severance of the splice. The old method was unreliable and often caused long unacceptable delays, particularly in professional projection rooms as well as in amateur use.

In recent years others have designed devices which were intended to eliminate the old prior art problems cited and which employed thin, transparent, self-adhering tape to join abutting ends of a spliced film. None of these recent prior art devices using such joining materials have proven successful to any substantial degree.

All of the prior art structures devised to utilize "Scotch" tape or the like as the joining material are complex, complicated, difficult to use, and are generally unsatisfactory for many reasons. The tape sticks to the structural parts of the device in undesirable places, at the wrong time, and are most difficult to use. They are all also exceedingly expensive to manufacture and maintain, compared to the less complicated design of this invention, and objectionable to the "home movie maker" and professional alike.

It is a principal object of this invention to provide an improved device which is more efficient, is far more simple and is less complicated, requiring fewer parts, is easy to operate by amateur and professional alike, and which may be manufactured and sold at a much lower price, provides higher quality splicing and joining of film, and which at the same time is easy to use and inexpensive to maintain.

Another important object is to provide a device which eliminates sticking, jambing, poor alignment of film ends to be joined, and is simple in design, non-automatic, economical to own and operate, and durable in use, eliminating costly repairs and adjustments and special tapes.

A still further object is to provide a film splicing device which eliminates a large number of complex parts used by prior art devices which are inoperative to produce the results they seek when in actual use and to provide a simple device which may be successfully used by any layman in a truly foolproof manner.

Many other advantages and improvements residing in this invention over the structure of old prior art devices will become more fully apparent from a reading of the following detailed description of this invention in conjunction with the accompanying drawings, wherein:

FIGURE 3 is an exploded view of the three major swingably movable elements which include the film cross cutting element at the top, the intermediate cross cutting base in the middle, and the main lower base at the bottom.

FIGURE 4 is a cross-sectional view of the cross cutting base of the device taken on the line 4—4 of FIGURE 1, looking in the direction of the arrows, showing the top cross cutting element hinged thereto and in raised position, and a section of film to be spliced lying upon the top surface of the intermediate cutting base in position to be cross cut.

Figure 2:
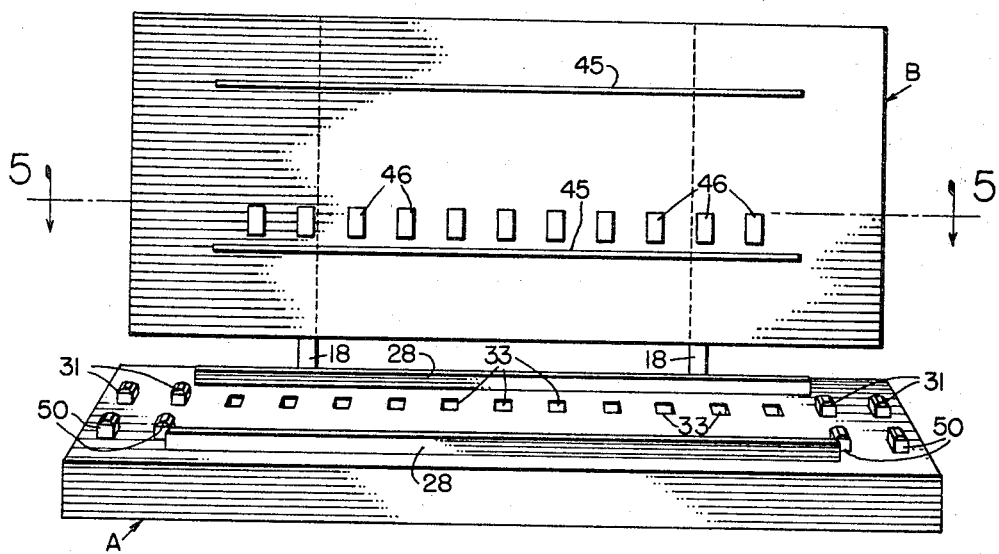
FIGURE 2 is another front perspective view of this film splicer illustrating the cross cutting base in raised position disclosing the pair of longitudinally extending film side edge trimming knives mounted on the underside of the cutting base.
Figure 5:
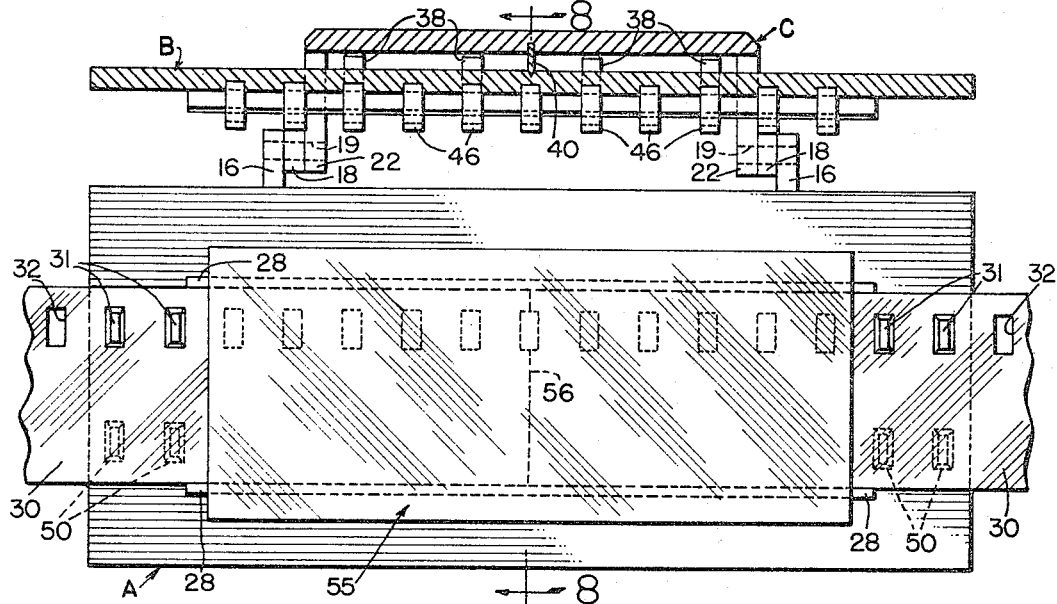

FIGURE 5 is a cross-sectional view taken on the line 5—5 of FIGURE 2, looking in the direction of the arrows, and showing both the cross cutting element and the intermediate cutting base in raised position, hinged to the main lower base upon which is shown the film with its abutting ends in contact with each other and a section of transparent self-adhesive tape of any desirable length applied to and overlying and pressure joined to the film.

Figures 6, 7:
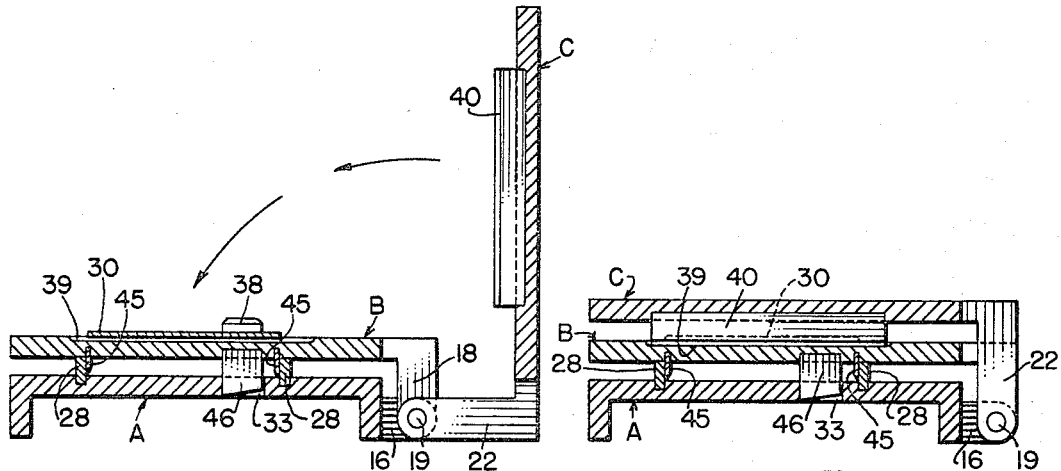

FIGURE 6 is a cross-sectional view taken on line 6—6 of FIGURE 4, looking in the direction of the arrows.

FIGURE 7 is another cross-sectional view similar to FIGURE 6 but showing the top cross-cutting position.

Figure 8:
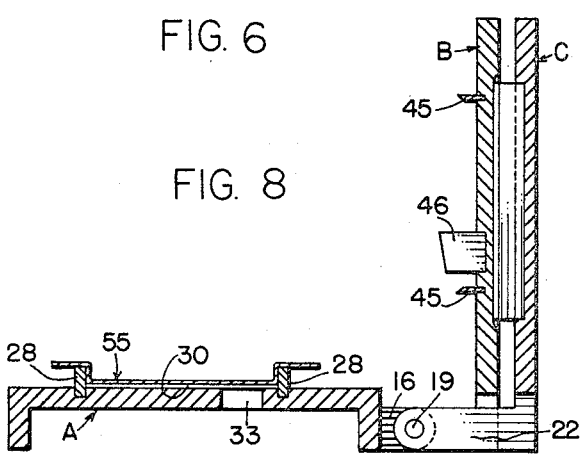

FIGURE 8 is a cross-sectional view taken on line 8—8 of FIGURE 5, looking in the direction of the arrows.

FIGURE 9 is a cross-sectional view similar to FIGURE 6 but showing the film and adhesive tape in position on the device for the final side edge trimming operation.

Referring now to the drawings in detail in which like numerals designate like parts throughout the several views, the improved splicing device of this invention comprises a main lower mounting base A having a pair of lateral hinges 16 formed along one side edge of said base, as illustrated in the drawings, an intermediate cutter base B which is disposed above main base A and lies in the same horizontal plane as main base A when in closed position, as in FIGURES 1, 4, 6, and 9. Base B is hingedly connected with lower base A of a pair of offset arms 18 which are arranged to swing on pivot rods 19 which also pass through the pair of laterally extending base hinges 16. A third major swingably movable cross cutter element C is also hingedly connected with the lower main base A by means of a pair of integral offset hinge arms 22 which are mounted to be swung on the same pivot rods 19 in the same manner as is the intermediate cutter base B hereinbefore described.

Thus, it is apparent that the second or intermediate cutter base B and top cutter element C form, when operatively and swingably joined together on the pivot rods 19 of lateral hinges 16 of the lower mounting base A and when in closed position, an articulated three-layer splicing device, A, B, C, respectively.

The lowermost main mounting base A has a pair of upwardly projecting elongated film guide members 28, see FIGURES 2, 3, 5, and 6 through 9, which are mounted or formed thereon and extend lengthwise of base A. Guide members 28 are spaced apart 8 mm., 16 mm., 35 mm., or any width required to closely accommodate the particular film gauge for which the splicer may be designed. A film 30, which is to be spliced, is shown in the drawings. Suitable upwardly projecting holding and alignment pins 31 are provided adjacent the outer ends of the top surface of base A, as illustrated in the drawings. Pins 31 are spaced to correspond with the sprocket holes 32 of the film to be spliced. A plurality of holes 33 are also provided in the top surface of base A which are similarly spaced to correspond with the spacing of the sprocket holes 32 of film 30.

Figure 1:
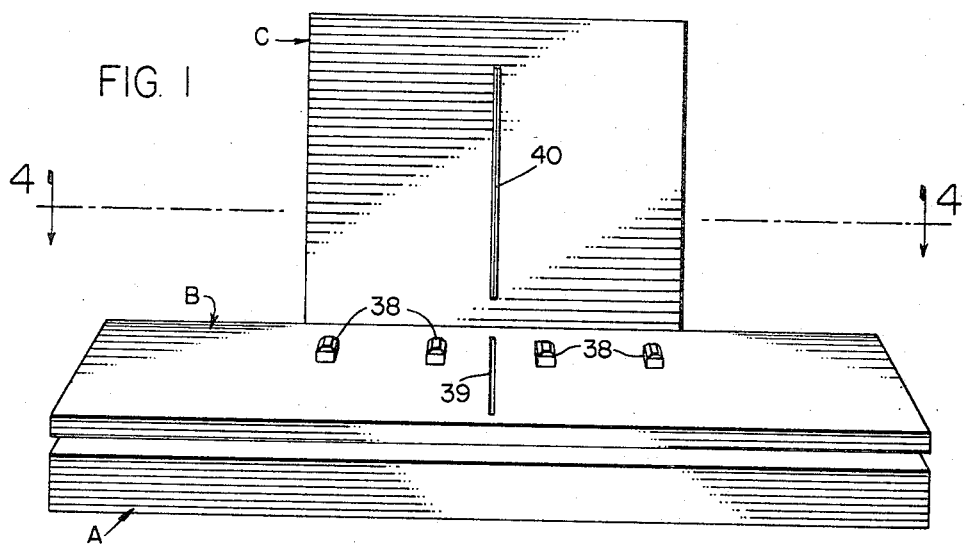
FIGURE 1 is a front perspective view of the improved film splicer and joining device of this invention illustrating the film cross cutting element in raised position over the cutting base.

Intermediate hinged base B is provided with a plurality of aligned upwardly projecting pins 38 on its top plane surface which are spaced to engage the sprocket holes 32 of film 30 to be spliced as best shown in FIGURE 1. A transverse cutter blade receiving slot 39 is also formed in the top plane surface of base B as shown.

The third and top hinged cutter element C has a downwardly depending cutting knife blade 40 extending transversely of element C and fixed on its under surface. Cutter blade 40 is arranged in alignment with cutter blade receiving slot 39 of intermediate base B and adapted to enter slot 39 to cut the film when desired.

The underside surface of intermediate hinged element B has a pair of longitudinally extending film edge trimming cutter blades 45 mounted thereon which are arranged to be in shearing relationship with elongated film guide members 28 projecting upwardly from base A when intermediate element B is closed down on top of A, see FIGURES 6, 7, 8, and 9 in particular.

Intermediate hinged base B is also provided with a plurality of aligned downwardly depending pins 46 extending from its underside surface which are spaced to engage sprocket holes 32 of film 30 and holes 33 of base A.

A second pair of upwardly projecting locating and alignment pins 50 may be provided, if desired, adjacent the outer ends of the top surface of lowermost base A, as well illustrated in FIGURE 2. Pins 50 may be utilized to engage sprocket holes 32 of film 30 in the same manner as pins 31, as shown in FIGURE 5. If the modern 8 mm. film is being used, for example, sprocket holes generally extend along only one side edge of the film 30. If 16 mm., 35 mm., or other larger widths of film are to be spliced, sprocket holes 30 are commonly extended along both side edges of the film. In either event, both sets of pins 31 and 50 will be generally employed. Pins 31 and 50 may be removable to allow adhesive to be applied to the reverse side of modern 8 mm. film. The film would be flipped over about a longitudinal axis to expose the reverse side. Pins 31 would be removed and pins 50 would be inserted. The film, with the reverse side exposed is placed over the pins 50. It should be noted that if only fixed pins 31 are provided, the film would have to be flipped over about a transverse axis in order to align the sprocket holes with pins 31.

In FIGURE 5, there is illustrated a strip of adhesive tape 55 applied along the top surface of two sections of spliced film 30, which have been located with the ends of each section in abutting relationship meeting along dotted line 56.

The strip of adhesive tape 55 may be of any desirable length. It is preferred that the lengths of the adhesive tape 55 be less than the length of the side cutters 28. The length of the tape 55, which is shown in FIGURE 5 for purposes of illustration only, covers all of the holes in the film inside of freely projecting pins 31. It may be necessary, in some cases, for the splicing tape 55 to cover only two or three sprocket holes on either side of the abutting film sections 30 which are to be joined. The lengths of the splicing tape 55 may be varied as the situation requires.

In the preferred embodiment of this invention, the height of the elongated film guide member 28 is such that the film guide members provide an upper cutting edge to effectively sever the adhesive tape to a width substantially equal to the width of the film 30. The trimmed width of the adhesive tape is dependent upon the height of the film guide members 21. Therefore, by providing film guide members of minimum height, the adhesive tape portions lying vertically along the side of guide members 28, as shown in FIGURE 8, are reduced to a minimum, if not eliminated entirely. The trimming blades 45 are sized to engage the upper cutting edge of member 28 when base B is moved toward its lower position; the trimming blades are also sized to remain above the flat table portion of base A when base B is in its lowest position to prevent damaging the edges of film 30.

Hence, the height of the preferred embodiment of the elongated film guide members 28, above the flat table portion of the base A, is greater than the thickness of the film 30, the exact height is dependent, to a large extent, on the type of adhesive tape used in the film splicing device. Generally, the height need not be greater than the combined thickness of the film 30 and adhesive 55 to completely sever the excess portions of the adhesive tape.

The operation of the motion picture film splicer of this invention is as follows:

First step: Raise the top element C to position shown in FIGURES 1 and 6. Top C will swing on hinge pivot 19 exposing top surface of intermediate cross cutting base B.

Next step: Place the strip of film 30 to be spliced on top surface of intermediate base B, aligning sprocket holes 32 on upstanding pins 38 of base B, as shown in FIGURE 5, with point at which film is to be cut located directly over slot 39 of base B.

Third step: Swing top element C down over intermediate base B firmly and cutter blade 40 will cut and pass through film 30 entering slot 39, as shown in FIGURE 7. When cut has been completed, raise top C back to its previous position, as shown in FIGURES 1 and 6.

After cutting film 30 in several places in this manner, remove undesired or damaged section of film.

Fourth step: Lift ends of film 30 from top of intermediate base B and raise base B to position shown in FIGURES 2 and 8.

Fifth step: Replace film sections, which are to be spliced together on the exposed top of lower base A, between upstanding aligning guide members 28 with the two ends to be joined together in abutting relationship (see FIGURE 5) with the sprocket holes engaging upwardly projecting locating pins 31, 8 mm. film having sprocket holes along one edge only, are to be joined. Locating pins 50 will also be used if film has sprocket holes along both edges.

Sixth step: Apply adhesive tape 55 to upper side of film 30, as shown in FIGURES 5 and 8. Press tape 55 firmly down on film 30 which will joint both sections of film 30 together.

Seventh step: This step is illustrated in FIGURE 9. The intermediate member B is swung down over lower base A and the pair of lengthwise downwardly depending cutter members will colsely engage the inner edges of the guide channel members 28 in a shearing action which will trim the tape 55 exactly along the edges of the film 30 and simultaneously downwardly depending members 46, which are carried by the intermediate member B, will punch holes in tape 55 corresponding exactly in size and location as the sprocket holes 32 of film 30 which the tape has covered. Thus, a single operation clears excess tape from sprocket holes and the edges of film 30. A portion of tape 55 which has been cut away is illustrated in FIGURE 9 in the position it would assume as it drops downwardly from the spliced film.

This film splicer may be made of any desirable material, injection molded plastics for example, with the possible exception of the elongated guide members of lower base A, and trimming knives 45, and punch members 46 carried by intermediate member C on its underside, which parts could be of suitable steel to effect sharp cutting, edge trimming, and hole punching action.

The simply designed three hinged parts A, B, and C, can be manufactured at low cost of long wearing durable materials and easily assembled. There are no springs, reels, levers, gears, complex adjustment devices, nor bolts, screws as are present in all prior art devices.

The splicer of this invention can be operated by unskilled persons rapidly and will always produce a perfect splice.

The embodiment of the present invention described and disclosed herein is for purposes of illustration only, and it will be apparent to one skilled in the art that various changes and modifications, singly or collectively, may be made therein without departing from the essence of the invention or from the scope of the appended claims.

What I claim is:

1. A film splicing device comprising a base including a flat table portion for supporting a pair of film strips in end-to-end relation, at least one base sprocket pin adjacent opposite edges of said table portion for engagement with a sprocket hole in each film strip for positioning the ends of the pair of film strips in abutting relation, a pair of parallel guiding and shearing blades fixed on said base, said blades having a distance therebetween equal to the width of the film strips, said blades extending above the plane of said table portion a distance approximately equal to the combined thickness of the film strip and an adhesive material used to bind the pair of film strips together, and a plurality of sprocket holes between the base sprocket pins, said sprocket holes being spaced apart a distance equal to the distance between the sprocket holes in the film strips; an intermediate means pivotally connected to said base for movement from an open position to a cutting and punching position in a plane parallel to said flat table portion, said intermediate means including a pair of parallel shearing and moving means fixed on the lower side of said intermediate means confronting said base, said shearing and moving means being positioned to mate with said guiding and shearing blades for shearing and moving the edges of the adhesive material, said shearing and moving means extending below said intermediate means a distance less than the height of said guiding and shearing blades for moving the edges of said adhesive material into engagement with the edges of the film strips, a plurality of sprocket hole shearing means fixed in said intermediate means and positioned to mate with said sprocket holes in said base for shearing the adhesive material overlaying the sprocket holes of the film, at least one pair of sprocket pins adjacent opposite edges of said intermediate means on the upper side of said intermediate means, said sprocket means being extensions of said sprocket hole shearing means for engagement with the film sprocket holes to align the film on said intermediate means for transverse shearing, and a slot in said intermediate means between said pair of sprocket pins; and cutting element pivotally connected to said base including a fixed cutting means for movement to and from said slot for transversely severing the film strips on said intermediate means.

2. A film splicing device comprising a base including a flat table portion for supporting a pair of film strips in end-to-end relation, at least one base sprocket pin adjacent opposite edges of said table portion for engagement with a sprocket hole in each film strip for positioning the ends of the pair of film strips in abutting relation, a pair of parallel guiding and shearing blades fixed on said base, said blades having a distance therebetween equal to the width of the film strips, said blades extending above the plane of said table portion a distance approximately equal to the combined thickness of the film strip and an adhesive material used to bind the pair of film strips together, and a plurality of sprocket holes between the base sprocket pins, said sprocket holes being spaced apart a distance equal to the distance between the sprocket holes in the film strips; an intermediate movable means connected to said base for movement from an open position to a cutting and punching position in a plane parallel to said flat table portion, said intermediate means including a pair of parallel shearing and moving means fixed on the lower side of said intermediate means confronting said base, said shearing and moving means being positioned to mate with said guiding and shearing blades for shearing and moving the edges of the adhesive material, said shearing and moving means extending below said intermediate means a distance less than the height of said guiding and shearing blades for moving the edges of said adhesive material into engagement with the edges of the film strips, a plurality of sprocket hole shearing means fixed on said intermediate means and positioned to mate with said sprocket holes in said base for shearing the adhesive material overlaying these sprocket holes for the film, and at least one sprocket pin adjacent opposite edges of said intermediate means on the upper side of said intermediate means for engagement with the film sprocket holes to align the film for transverse shearing; and a movable cutting element connected to said base, said element including a fixed cutting means for movement to and from said intermediate means for transversely severing the film on said intermediate means.

3. A film splicing device comprising a base including a flat table portion for supporting a pair of film strips in end-to-end relation, at least one base sprocket pin adjacent opposite edges of said table portion for engagement with a sprocket hole in each film strip for positioning the ends of the pair of film strips in abutting relation, a pair of parallel guiding and shearing blades having a distance therebetween equal to the width of the film strips, said blades extending above the plane of said table portion a distance approximately equal to the combined thickness of the film strip and an adhesive material used to bind the pair of film strips together, and a plurality of sprocket holes between the base sprocket pins, said sprocket holes being spaced apart a distance equal to the distance between the sprocket holes in the film strips; an intermediate movable means connected to said base for movement from an open position to a cutting and punching position in a plane parallel to said flat table portion, said intermediate means including a pair of parallel shearing means connected to the lower side of said intermediate means confronting said base, said shearing means being positioned to mate with said guiding and shearing blades for shearing the adhesive material, said shearing and moving means extending below said intermediate means a distance less than the height of said guiding and shearing blades for moving the edges of said adhesive material into engagement with the edges of the film strips, a plurality of sprocket holes shearing means connected to said intermediate means and positioned to mate with said sprocket holes in said base for shearing the adhesive material overlaying the sprocket holes of the film, and at least one sprocket pin adjacent opposite edges of said intermediate means on the lower side of said intermediate means for engagement with the film sprocket holes to align the film for transverse shearing; and a movable cutting element connected to said base including a cutting means for movement to and from said intermediate means for transversely severing the film on said intermediate means.

4. A film splicing device comprising a base for supporting a pair of film strips in end-to-end relation, said base including at least one base sprocket pin adjacent opposite edges of said table portion for engagement with a sprocket hole in each film strip for positioning the ends of the pair of film strips in abutting relation, a pair of parallel guiding and shearing blades fixed on said base, said blades having a distance therebetween equal to the width of the film strip, said blades extending above the plane of said table portion a distance approximately equal to the combined thickness of the film strip and an adhesive material used to bind the pair of film strips together, and a plurality of sprocket holes between the base sprocket pins, said sprocket holes being spaced apart a distance equal to the distance between the sprocket holes in the film strips; a movable intermediate means connected to said base for movement from an open position to a closed cutting and punching position in a plane parallel to said base, said intermediate means including a pair of parallel shearing means fixed on said intermediate means for interaction with said blades to shear adhesive material overlaying the upper extremities of said blades, a plurality of sprocket hole shearing means fixed on said intermediate means for interaction with said sprocket holes in said base, at least two pair of sprocket pins extending above said intermediate means for engagement with the sprocket holes in the film to align film on the upper surface of said intermediate means for cutting the film, and a slot between the two pair of sprocket means on said intermediate means; and a movable cutting element connected to said base including a cutting means for movement to and from said slot for transversely severing the film on said intermediate means.

5. A film splicing device comprising a base for supporting a pair of film strips in end-to-end relation, said base including means for engagement with a sprocket hole in each film for positioning the ends of the pair of film strips in abutting relation, a pair of parallel guiding and shearing blades fixed to said base, said blades being spaced apart a distance equal to the width of the film strip, said blades extending above the plane of said table portion a distance approximately equal to the combined thickness of the film strip and an adhesive material used to bind the pair of film strips together, and a plurality of sprocket holes between the sprocket pins, said sprocket holes being spaced apart a distance equal to the distance between the sprocket holes in the film strips; a movable intermediate means connected to said base for movement from an open position to a closed cutting and punching position, said intermediate means including a pair of parallel shearing means connected to said intermediate means for interaction with said blades to shear adhesive material overlaying the upper extremities of said blades, a plurality of sprocket holes, shearing means connected to said intermediate means for interaction with said sprocket holes in said base, at least two pair of sprocket means extending above said intermediate means for engagement with the film sprocket holes to align the film on the upper surface of said intermediate means for cutting the film, and a slot between the pairs of sprocket means on said intermediate means; and a movable cutting element connected to said base including a cutting means for movement to and from said slot for transversely severing the film on said intermediate means.

6. A film splicing device comprising a base for supporting a pair of film strips in end-to-end relation, said base including means for positioning the ends of the pair of film strips in abutting relation, a pair of parallel guiding and shearing blades fixed to said base, said blades being spaced apart a distance equal to the width of the film strip, said blades extending above the plane of said table portion a distance approximately equal to the combined thickness of the film and an adhesive material used to bind the pair of film strips together, and a plurality of sprocket holes between the sprocket pins, said sprocket holes being spaced apart a distance equal to the distance between the sprocket holes in the film strips; a movable intermediate means connected to said base for movement from an open position to a closed cutting and punching position, said intermediate means including a pair of parallel shearing means connected to said intermediate means for interaction with said blades to shear adhesive material overlaying the upper extremities of said blades, a plurality of sprocket hole shearing means connected to said intermediate means for interaction with said sprocket holes in said base, and sprocket means extending above said intermediate means for engagement with the film sprocket holes to align the film on the upper surface of said intermediate means for cutting the film; and a movable cutting element pivotally connected to said base including a cutting means for movement to and from said intermediate means for transversely severing the film on said intermediate means.

7. A film splicing device comprising a base including at least one base sprocket pin adjacent opposite edges of said base for engagement with a sprocket hole in a film placed on said base for positioning the ends of a pair of film strips in abutting relation, a pair of parallel guiding and shearing blades fixed on said base, said blades being spaced apart a distance equal to the width of the pair of film strips, and a plurality of sprocket holes between the base sprocket pins, said sprocket holes being spaced apart a distance equal to the distance between the sprocket holes in the film strips; a movable intermediate means connected to said base for movement from an open position to a cutting and punching position in a plane parallel to said base, said intermediate means including a pair of parallel shearing and moving means fixed on the side of said intermediate means confronting said base, said shearing and moving means being positioned to mate with said guiding and shearing blades for shearing and moving the edges of the adhesive material, said shearing and moving means extending below said intermediate means a distance less than the height of said guiding and shearing blades, a plurality of sprocket hole shearing means fixed on said intermediate means and positioned to mate with said sprocket holes in said base, at least one sprocket means adjacent opposite edges of said intermediate means on the side of said intermediate means opposite said base, said sprocket means being extensions of said sprocket hole shearing means for engagement with the film sprocket holes to align the film on said intermediate means for transverse shearing, and a slot in said intermediate means between said extensions; and a movable cutting element connected to said base including a cutting means fixed to said element for movement to and from said slot for transversely severing the film strips placed on said intermediate means.

8. A film splicing device comprising a base including at least one base sprocket pin adjacent opposite edges of said base for engagement with a sprocket hole in a film placed on said base for positioning the ends of a pair of film strips in abutting relation, a pair of parallel guiding and shearing blades fixed to said base, said blades being spaced apart a distance equal to the width of the pair of film strips, and a plurality of sprocket holes between said base sprocket pins; a movable intermediate means connected to said base for movement from an open position to a cutting and punching position, said intermediate means including a pair of parallel shearing means fixed to the side of said intermediate means confronting said base, said shearing and moving means being positioned to mate with said guiding and shearing blades for shearing the adhesive material overlaying the film sprocket holes, said shearing means extending below said intermediate means a distance less than the height of said guiding and shearing blades, a plurality of sprocket hole shearing means fixed to said intermediate means and positioned to mate with said sprocket holes in said base, at least one sprocket means adjacent opposite edges of said intermediate means on the side of said intermediate means opposite said base for engagement with the film sprocket holes to align the film on said intermediate means for transverse shearing; and a movable cutting element connected to said base including a cutting means fixed to said element for movement to and from said intermediate means for transversely severing the film on said intermediate means.

9. A film splicing device comprising a base including at least one means adjacent opposite edges of said base for engagement with the films placed on said base for positioning the ends of a pair of film strips in abutting relation, a pair of parallel guiding and shearing blades connected to said base and being spaced apart a distance equal to the width of the film strips, and a plurality of sprocket holes between said means; a movable intermediate means connected to said base for movement from an open positioin to a cutting ad punching position, said intermediate means including a pair of parallel shearing means connected to the side of said intermediate means confronting said base, said shearing and moving means being positioned to mate with said guiding and shearing blades, said shearing means extending below said intermediate means, a plurality of sprocket hole shearing means connected to said intermediate means and positioned to mate with said sprocket holes in said base, and means connected to said intermediate means for holding the film in position on said intermediate means for transverse cutting of the film; and a movable cutting element connected to said base including a cutting means for movement to and from said intermediate means for transversely severing the film on said intermediate means.

10. A film splicing device comprising a trimming table including a single fixed pair of film guiding and adhesive trimming means having a height approximately equal to the combined thickness of a film to be spliced and an adhesive material used to bind the film together, and at least one pair of means fixing the position of the ends of two films being spliced in abutting relationship; and a movable intermediate means connected to said trimming table, said intermediate means including a fixed pair of parallel shearing and moving means sized and positioned to interact with said guiding and trimming means to trim and position the edges of the adhesive material on the film lying between said guiding and trimming means when said intermediate means is moved from an open position to a closed position.

11. A film splicing device comprising a trimming table including a single pair of film-guiding and adhesive trimming means immovably connected to said table, said means having a height approximately equal to the combined thickness of a film to be spliced and an adhesive material used to bind the film together, and at least one pair of means fixing the position of the adjacent ends of two films being spliced in abutting relationship; a movable intermediate means connected to said trimming table, said intermediate means including a fixed pair of parallel shearing means sized and positioned to interact with said guiding and trimming means to trim the edges of the adhesive material when said intermediate means is moved from an open position to a closed position; and a movable cutting means connected to said table for movement into engagement with said intermediate means for cutting film on said intermediate means.

References Cited
UNITED STATES PATENTS

| | | | |
|---|---|---|---|
| 2,565,009 | 8/1951 | Wallingsford | 156—505 |
| 2,778,420 | 1/1957 | Simon | 156—505 |
| 2,794,489 | 6/1957 | Drummond | 156—505 |
| 3,075,572 | 1/1963 | Catozzo | 156—505 |

DOUGLAS J. DRUMMOND, *Primary Examiner.*